Dec. 22, 1942.   F. W. DUGGAN ET AL   2,306,046
COMPOSITE STRUCTURE
Filed May 12, 1939
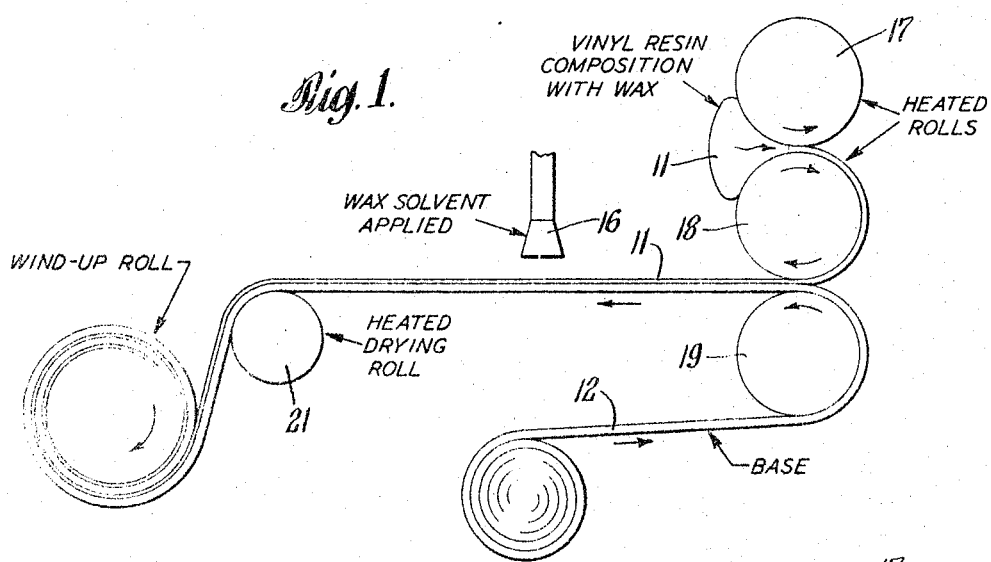
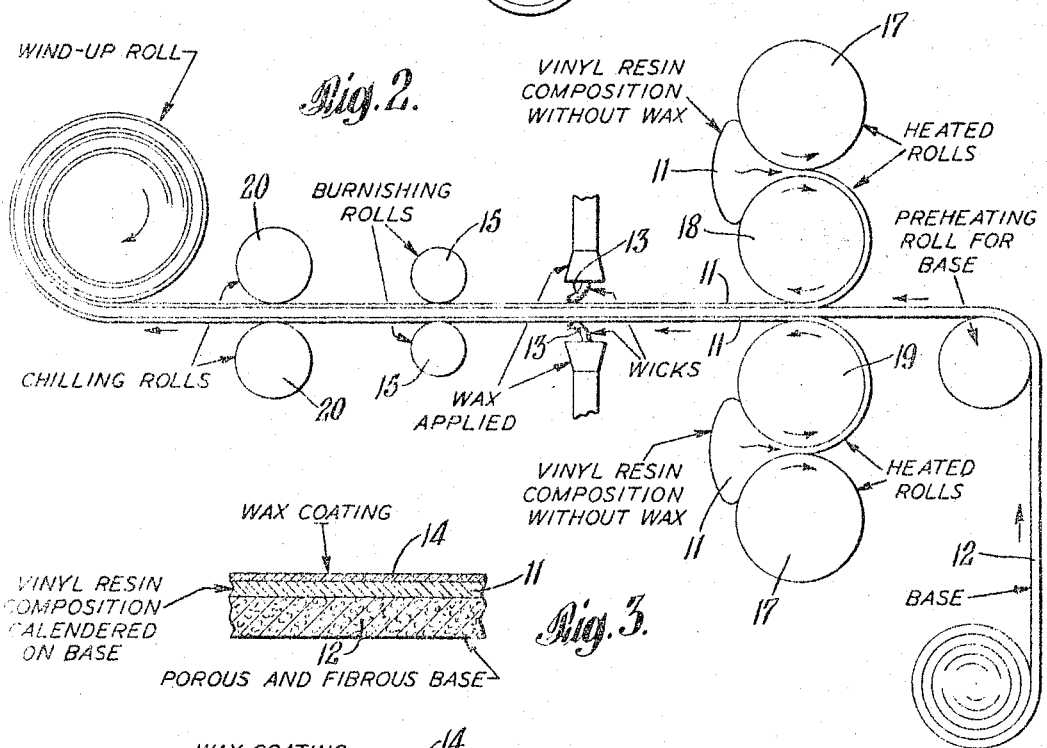
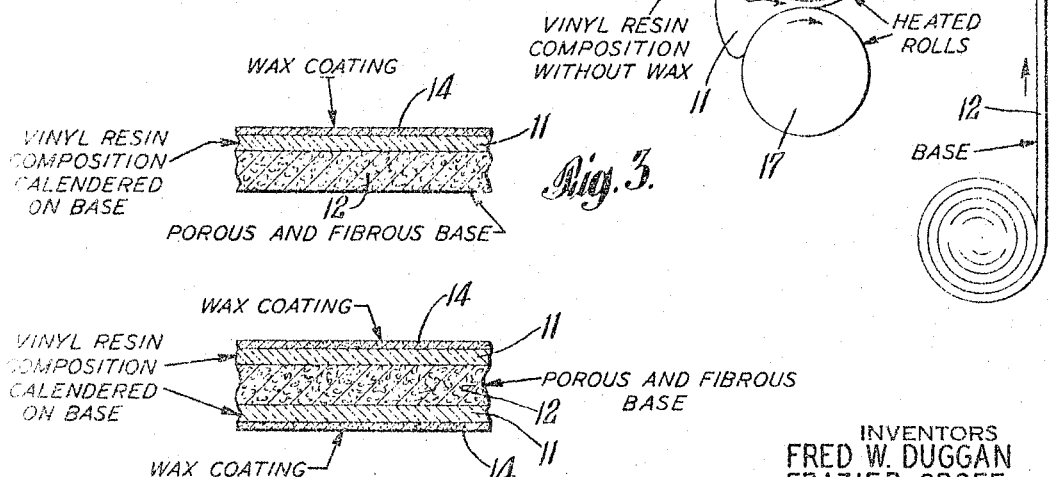
INVENTORS
FRED W. DUGGAN
FRAZIER GROFF
BY
ATTORNEY Patented Dec. 22, 1942

2,306,046

UNITED STATES PATENT OFFICE 2,306,046

COMPOSITE STRUCTURE

Fred W. Duggan, Charleston, W. Va., and Frazier Groff, Lakewood, Ohio, assignors to Carbide and Carbon Chemicals Corporation, a corporation of New York Application May 12, 1939, Serial No. 273,202

14 Claims. (Cl. 117—72)

This invention is directed to the production of composite structures of the class in which at least one surface of a porous and fibrous sheet material, such as cloth and paper, is provided with an adherent coating of a vinyl resin composition adapted to render the resulting composite structure highly impervious to the transmission of water and other liquids and vapors.

Composite structures of this class are known, and various methods for making them have been proposed. For example, it has been suggested that the protective coating containing a vinyl resin may be applied to sheet materials in the form of a varnish or lacquer. This method is not wholly satisfactory when applied to fibrous materials, such as cloth or paper, for the reason that there may be fibers which escape complete coating, and which, acting as wicks, tend to defeat the purpose of the coating as far as imperviousness to liquids is concerned. Also this method of coating, in which a solution of the vinyl resin composition is required, necessitates handling the wet coated product prior to drying, and the loss of solvents driven off during drying, or the cost of recovering these solvents.

Other proposed methods for making the composite materials of the class with which this invention is concerned have included hot-pressing a preformed film of the vinyl resin composition in contact with the material to be coated, and the similar procedure of applying powdered vinyl resin composition over the material on which a coating is desired, and pressing under the influence of heat to flow the vinyl resin and form a coating. Both of these methods have the disadvantage of being discontinuous since a press is required, and, while the first-named procedure may be made continuous by pressing the preformed film and the material to be coated between heated rollers, the process still possesses the disadvantage of requiring the additional step of making the film initially.

This invention largely obviates the disadvantages of previously known processes for making composite materials which comprise a surface coating or coatings or vinyl resin composition. The principal object of the invention is to provide an improved, economical and efficient process capable of continuous operation for producing composite materials having at least one surface formed of an impervious vinyl resin composition. The invention also includes the new composite products.

The process by means of which the objects of this invention are attained broadly comprises continuously forming a film of vinyl resin composition by the aid of heat and pressure, maintaining the formed film at an elevated temperature, and continuously pressing this heated film against a base sheet material with which it is to be combined to form the desired composite. The composite material is then further treated to achieve the desired degree of imperviousness to water and the like, all as more fully hereinafter described.

To facilitate an understanding of the invention, reference may be had to the accompanying drawing, wherein:

Fig. 1 diagrammatically illustrates a method and apparatus for calendering onto one side of a base, a coating of vinyl resin composition containing wax, and applying a wax solvent;

Fig. 2 diagrammatically illustrates a method and apparatus for calendering onto both sides of a base, a coating of vinyl resin composition and thereafter applying wax and further processing the material;

Fig. 3 shows a section through the material processed as illustrated in Fig. 1, and Fig. 4 shows a section through the material processed as illustrated in Fig. 2.

In practice this process is most conveniently carried out by calendering the vinyl resin composition 11 against one or both surfaces of a base sheet 12, such as paper or fabric, under such conditions of temperature and pressure as to result in firm union of an unbroken film of the vinyl resin composition of the thickness desired with the base sheet to form a composite material. Thereafter a vinyl resin-bearing surface of this material is given a treatment whereby a tightly adherent, very thin, wax-containing coating of maximum imperviousness to liquids and vapors, particularly water, is produced on it. This latter treatment may, in general, assume one of three forms. First, the wax may be heated to a molten or near-molten state or it may be dispersed or dissolved in liquids which do not attack the vinyl resin surface of the material, and in this form mechanically applied, for instance by wicks 13, as a thin layer 14 which can be polished or burnished, as by rollers 15, to convert it into the desired continuous, thin and adherent form which we have found capable of affording maximum protection. Second, the wax may be applied as an emulsion in an aqueous menstruum employing as the emulsifying agent a material which will not allow the wax film deposited from the emulsion to be redispersed on contact with water. Third, the wax may be employed as a component of the vinyl resin composition initially joined to the base sheet and, by the action of a liquid which is a solvent for the wax, and a penetrant, but not a solvent for the vinyl resin, subsequently applied, as by sprayer 16, to this composition, it may be brought to the surface and formed into a continuous film.

The vinyl resins used in the compositions of this invention may be those produced by the polymerization of vinyl esters including vinyl halides and vinyl esters of aliphatic acids, and the invention is primarily concerned with compositions containing vinyl resins such as may be formed by the conjoint polymerization of vinyl halides with vinyl esters of aliphatic acids. In resins of this class, in which the vinyl halide predominates and preferably constitutes from 70% to 95% by weight of the polymer, are found the most desirable properties for use in the practice of this invention. Specifically, resins which may be made by the conjoint polymerization of vinyl chloride with vinyl acetate and which contain from 80% to 90% by weight of the chloride are most desirable. Other components of the vinyl resin composition may include stabilizers, such as the metal soaps of which calcium stearate and lead stearate are typical, and lubricating materials, such as mineral oils or paraffin and carnauba wax. The composition may be colored by means of pigments, lakes or dyes if desired. It may be rendered flexible and soft in any desired degree by including plasticizers for the vinyl resin. Examples of suitable plasticizers are such high boiling esters as dibutyl phthalate, di-(beta butoxyethyl) phthalate, dichlorethyl phthalate, tricresyl phosphate, dibutyl tartrate and related substances.

The final treatment of the vinyl resin surface of the composite material to attain the degree of impermeability to water and the like which is achieved by this invention involves the use of a high melting (that is, above about 65° C.) paraffin or similar high melting wax of hydrocarbon nature, such as ceresin or beeswax, capable of existing in crystalline or pseudo-crystalline form. Lower melting point waxes can be used with somewhat less desirable results.

The ingredients referred to may be present in the vinyl resin composition used in various proportions chosen according to the properties desired in the material produced. In general, for compositions of adequate flexibility and softness the vinyl resin may be combined with from about 10% to about 30% by weight of a plasticizer and from about 1% to 3% of stabilizer and lubricant material combined. If the wax is incorporated in the vinyl resin composition, from 0.5% to about 5.0% is usually sufficient.

The union of a surface film of the vinyl resin composition to a base sheet, such as paper, can be effected by the use of a multi-roll calendering machine. For example, the vinyl resin composition in which the ingredients have been previously combined by any suitable means can be caused to pass between the first and second rolls, 17 and 18, respectively, of a three roll machine to form a film of somewhat greater thickness than that which actually is to be secured to the base sheet. This film passes around the second roll to enter the opening between that roll and the third roll 19. The sheet 12 of material to be coated is passed into the opening between the second and third rolls together with the vinyl resin film so that it is pressed in contact with the film. By adjustment of the openings between the rolls, the thickness of the film of resin composition and the pressure with which it is forced against the base sheet can be closely regulated. It is usually desirable to maintain such relative sizes of the openings between the rolls as to cause a reduction in the resin film thickness as it joins the base sheet material. This accomplishes automatic compensation for any inequalities in the surface or thickness of the resin film or base sheets as the resin film approaches contact with the base sheet.

The calendering rolls may be heated by steam supplied to their interiors, or by other means as desired. The temperature required for the several rollers involved in this operation will vary according to the thermoplasticity of the vinyl resin composition used, the thermal conductivity of the sheet material being coated, and the extent of penetration of the resin composition desired in the case of fibrous or porous sheet materials. In general, the initial forming of the resin film requires a temperature of about 110° to about 135° C. and this may be conveniently maintained by means of steam supplied to the calender rolls at gauge pressures of about 35 to about 60 pounds per square inch.

The application of the coating of vinyl resin composition to both sides of the base sheet material can be carried out in the same way. In case this is desired, it is only necessary that a four roll calendering machine be employed so that two preformed films can be made simultaneously between the first and second and the third and fourth rolls, while the sheet material to be coated enters the opening between the second and third rolls together with each of the two films so formed.

It is desirable, although not essential, that the base sheet material be preheated before coming in contact with the resin composition. This can be conveniently effected by passing the sheet material around a heated drum, an additional calender roll, or merely around 180° or somewhat more, of the circumference of the third roll of a three roll machine used to coat only one side of the material.

The treatment of the coated material to obtain the exceptionally high degree of imperviousness to moisture transmission made possible by this invention will be discussed in each of its three embodiments in the examples to follow.

*Example 1*

The first of these embodiments involves melting the wax, or dissolving the wax in a liquid which will not attack by dissolution or otherwise, the vinyl resin finish of the composite structure, and thereafter applying the liquid compositions thus formed to the vinyl resin surface. The application of the molten wax is preferably carried out by spreading the liquid wax over the vinyl resin surface while maintaining the composite structure at a temperature of about 75° C. to about 125° C. Means for thus spreading the liquid wax which have proved very effective include spraying, application by roller coating, and bringing the vinyl resin surface in contact with a wick of felt material thoroughly impregnated with the liquid composition. The applied wax coating is burnished by a rubbing treatment and the assembly permitted to cool. Rapid cooling may be carried out by passing the composite structure around a chilled roll 20 and results in enhanced brightness, lustre, and smoothness of the finished coating, caused, perhaps, by crystallization of the wax surface.

When the wax is applied as a solution in a liquid inert toward the vinyl resin finish, application may be by any convenient means, such as by spraying or by roller coating, and the composite structure being treated need not necessarily be heated. Upon removal of the liquid by evaporation, the wax is deposited on the vinyl resin surface and the wax coating may be burnished and evenly distributed by rubbing.

In each case, a smooth and very adherent wax-containing coating is deposited and the resistance of the treated composite structure to the transmission of water and other liquids and vapors was remarkably increased. For instance, a composition of the following components was prepared:

|  | Parts |
|---|---|
| Vinyl resin* | 78.9 |
| Di-(beta-butoxy-ethyl) phthalate | 18.0 |
| Carnauba wax | 1.3 |
| Calcium stearate | 0.8 |

*The vinyl resin was made by the conjoint polymerization of vinyl chloride with vinyl acetate and contained about 87% vinyl chloride in the polymer.

This composition was calendered on medium weight sulfite paper and a vinyl resin coating approximately 0.002 inch in thickness was formed. The rate of moisture transmission through the coated paper was found to be 0.15 mgm./hr./sq. cm. of surface when tested at 30° C. with saturated water vapor on one side of the paper and a dry atmosphere on the other side.

A high melting paraffin wax, the particular sample used having a melting point of about 70° C., was applied in molten form by means of the wicking and burnishing treatment described above to the coated paper. A wax coating only 0.00005 to 0.0001 inch in thickness was deposited and yet the rate of moisture transmission was reduced to values ranging from 0.01 to 0.03 expressed on the same scale, a reduction to a value ranging from 1/5 to 1/15 of the original value. The toughness, flexibility, and other properties of the treated paper were not observably different from those of the resin coated paper prior to treatment and the surface of the treated paper was bright and comparatively hard.

The use of the high melting paraffin wax in this embodiment of the invention is of importance. The lower melting waxes, such as those which melt around 52° C., are less satisfactory for use since their application results in a soft, dull, and greasy finish on the coated paper.

Example 2

The second embodiment of the process of treating the vinyl resin surface of the composite structure involves applying the wax as an emulsion in water employing as the emulsifying agent a material which will not permit the wax to be redispersed on contact with water. The emulsion may be applied to the vinyl resin surface in any convenient manner, such as by roller coating in which a doctor blade is used to control the distribution of the applied emulsion or by spraying. Emulsifying agents which may be used include fatty acid soaps of morpholine, such as morpholine oleate and morpholine stearate and fatty acid soaps of ammonia, such as ammonium laurate, ammonium stearate, and ammonium oleate.

The manner of preparation of the emulsions will be illustrated by several specific illustrations. The proportions subsequently mentioned are by weight.

One hundred and seventy-six (176) parts of a paraffin wax melting at about 55° C. were melted with 18 parts of stearic acid by heating to about 90° C. This melted mixture was added with violent agitation to a boiling solution of 4.3 parts of morpholine in 600 parts of water. The resulting emulsion was of the oil-in-water type. It was permitted to cool under moderate stirring to room temperature and it was observed that such an emulsion was very stable.

Another emulsion was prepared in a similar manner by heating a mixture of 88 parts of the paraffin wax, 88 parts of toluene, and 18 parts of oleic acid and dispersing the molten mixture in a boiling solution of 4.3 parts of morpholine in 600 parts of water. On cooling, a stable emulsion of the oil-in-water type was again obtained.

These emulsions were applied by spraying to the vinyl resin surface of a paper coated with vinyl resin. The manner of preparation of the coated paper was similar to that described in Example 1. During the spraying, the emulsions were maintained at room temperatures, whereas the temperature of the vinyl resin surface was permitted to vary between 20° C. and 130° C. It was observed that more uniform distribution of the emulsion was obtained when the vinyl resin surface was maintained at the higher temperatures. Upon evaporation of the water and any other volatile constituents of the applied emulsion, a uniform, hard, adherent, and very thin wax-containing coating was formed on the vinyl resin surface. This coating showed no tendency to redisperse on contact with water despite the residual amount of emulsifying agent present. The resistance of the vinyl resin coated paper to moisture transmission was markedly increased by the presence of the wax-containing coating. In many cases this increase was as much as six fold and in no case was it less than four fold.

In this embodiment of the invention, a lower melting wax may be employed with results almost as satisfactory as those which may be obtained by the use of the higher melting waxes.

Example 3

The third embodiment of the method of treating the vinyl resin surface of the composite structure involves originally incorporating the hydrocarbon wax in the vinyl resin composition and subsequently applying to the vinyl resin surface a liquid which is a solvent for the wax and a penetrant or swelling agent, but not a solvent, for the vinyl resin. The effect of this treatment is greatly to increase the resistance of the composite structure to moisture transmission, possibly induced by a rearrangement of the vinyl resin coating under the influence of the liquid so as to bring the wax constituent of the coating composition to the surface. Suitable liquids for use in this treatment include aromatic hydrocarbons, such as benzene, toluene, and xylene and solvent-diluent or solvent-non-solvent mixtures in which sufficient diluent or non-solvent is present in the mixture so that the mixture, taken as a whole, does not dissolve the vinyl resin. Solvents for the vinyl resin include acetone, methyl ethyl ketone, methyl isobutyl ketone, ethyl acetate, butyl acetate, and ethylene dichloride; diluents include benzene, toluene, xylene, and tetrahydronaphthalene; non-solvents include paraffin hydrocarbons, alcohols, aldehydes, and ethers.

Several modes of practicing this embodiment of the invention will now be given. A vinyl resin coating having the following composition was prepared:

| | Parts |
|---|---|
| Vinyl resins* | 68.5 |
| Modified alkyd resin | 8.0 |
| Calcium stearate | 1.5 |
| Di(beta-butoxy-ethyl) phthalate | 18.0 |
| Paraffin wax | 4.0 |

*The vinyl resin was substantially the same as that described in Example 1.

This vinyl resin coating composition was calendered onto a suitable paper backing. The vinyl resin surface was treated with the appropriate liquid in several ways; by roller coating, by bringing the vinyl resin surface in contact with a wick impregnated with the liquid, and by spraying. Spraying was found most effective and it was most desirably carried out by applying a very fine spray of the liquid to the vinyl resin surface. In this manner the wax was effectively brought to the surface of the vinyl resin coating without unduly softening the vinyl resin coating. After this treatment the wetted composite films were dried at 60° C., for instance by passing in contact with a drying roll 21, although other temperatures are satisfactory.

After applying a spray of toluene in this manner to the vinyl resin surface, it was found that the resistance of the composite film to moisture transmission was increased from two to four times. It was further found that improvement in these results could be obtained by incorporating in the treating liquid a small amount (about 1% of the liquid) of wax, or of a natural or artificial gum, such as a modified alkyd resin, or a mixture of wax and gum. Under these conditions, resistance of the composite film to moisture transmission was increased about four to six times and the results were more easily reproducible. Treatment of the vinyl resin surface with a solvent for the vinyl resin, such as acetone or ethylene dichloride, did not affect the moisture resistant properties of the composite film.

Modifications of the invention other than as described in the above examples will be apparent to those versed in the art to which the invention appertains and are included within the scope of the invention as defined in the appended claims.

We claim:

1. A composite structure highly impervious to the transmission of water vapor, comprising a sheet of porous and fibrous material firmly bonded to a substantially unbroken film of vinyl resin calendered thereon, said film being assisted in resisting the transmission of water vapor by the presence on the film of a continuous, adherent, and very thin coating essentially comprising a hydrocarbon wax.

2. A composite structure highly impervious to the transmission of water vapor, comprising a sheet of porous and fibrous material firmly bonded to a substantially unbroken film of vinyl resin calendered thereon, said film being assisted in resisting the transmission of water vapor by the presence on the film of a continuous, adherent, and very thin coating essentially comprising a hydrocarbon wax, said vinyl resin being substantially identical with that resulting from the conjoint polymerization of a vinyl halide with a vinyl ester of a lower aliphatic acid.

3. A composite structure highly impervious to the transmission of water vapor, comprising a sheet of porous and fibrous material firmly bonded to a substantially unbroken film of vinyl resin calendered thereon, said film being assisted in resisting the transmission of water vapor by the presence on the film of a continuous, adherent, and very thin coating essentially comprising a high melting hydrocarbon wax, said vinyl resin being substantially identical with that resulting from the conjoint polymerization of vinyl chloride with vinyl acetate.

4. A composite structure highly impervious to the transmission of water vapor comprising a sheet of porous and fibrous material firmly bonded to a substantially unbroken film of vinyl resin calendered thereon, said film being assisted in resisting the transmission of water vapor by the presence on the film of a continuous, adherent, and very thin coating essentially comprising a paraffin wax melting above about 65° C.

5. A composite structure highly impervious to the transmission of water vapor, comprising a sheet of porous and fibrous material firmly bonded to a substantially unbroken film of vinyl resin calendered thereon, said film being assisted in resisting the transmission of water vapor by the presence on the film of a continuous, adherent, and very thin coating essentially comprising a paraffin wax melting above about 65° C., said vinyl resin being substantially identical with that resulting from the conjoint polymerization of a vinyl halide with a vinyl ester of a lower aliphatic acid.

6. A composite structure highly impervious to the transmission of water vapor, comprising a sheet of porous and fibrous material firmly bonded to a substantially unbroken film of vinyl resin calendered thereon, said film being assisted in resisting the transmission of water vapor by the presence on the film of a continuous, adherent, and very thin coating from approximately 0.00005 to approximately 0.0001 of an inch in thickness essentially comprising a paraffin wax melting above about 65° C., said vinyl resin being substantially identical with that resulting from the conjoint polymerization of vinyl chloride with vinyl acetate, said composite structure having a moisture transmission between approximately 0.01 and approximately 0.03 mgm. per hour per sq. cm. at approximately 30° C. under the condition of saturated water vapor on one side of the structure and dry atmosphere on the other side.

7. Process for making a composite structure highly impervious to the transmission of water vapor, which comprises firmly adhering a substantially unbroken film of vinyl resin composition on a sheet of porous and fibrous material by calendering, and thereafter forming on said film a continuous, adherent, and very thin coating of a hydrocarbon wax adapted to assist said vinyl resin film in resisting the transmission of water vapor.

8. Process for making a composite structure highly impervious to the transmission of water vapor, which comprises firmly adhering a substantially unbroken film of vinyl resin composition on a sheet of porous and fibrous material by calendering, applying to the film thus deposited a molten composition comprising a hydrocarbon wax, and forming on said film a continuous, adherent, and very thin coating of said wax adapted to assist said vinyl resin film in resisting the transmission of water vapor.

9. Process for making a composite structure highly impervious to the transmission of water vapor, which comprises firmly adhering a substantially unbroken film of vinyl resin composition on a sheet of porous and fibrous material by calendering, applying to the film thus deposited a molten composition comprising a hydrocarbon wax melting above about 65° C., and forming on said film and continuous, adherent, and very thin coating of said wax adapted to assist said vinyl resin film in resisting the transmission of water vapor, said vinyl resin being substantially identical with that resulting from the conjoint polymerization of vinyl chloride with vinyl acetate.

10. Process for making a composite structure highly impervious to the transmission of water vapor, which comprises firmly adhering a substantially unbroken film of vinyl resin composition on a sheet of porous and fibrous material by calendering, applying to the film thus deposited a molten composition comprising a hydrocarbon wax melting above about 65° C., rapidly cooling the applied molten wax, and forming on said film a continuous, adherent, and very thin coating of said wax adapted to assist said vinyl resin film in resisting the transmission of water vapor, said vinyl resin being substantially identical with that resulting from the conjoint polymerization of vinyl chloride with vinyl acetate.

11. Process for making a composite structure highly impervious to the transmission of water vapor, which comprises calendering a substantially unbroken film of vinyl resin composition on a sheet of porous and fibrous material to give an adherent coating thereon and applying to the film thus deposited an emulsion comprising a hydrocarbon wax dispersed in water by the aid of an emulsifying agent, said emulsifying agent being selected from the group consisting of morpholine and ammonium salts of fatty acids, removing the volatile constituents from the emulsion, and forming on said film a continuous, adherent, and very thin coating of said wax adapted to assist said vinyl resin film in resisting the transmission of water vapor.

12. Process for making a composite structure highly impervious to the transmission of water vapor, which comprises calendering a substantially unbroken film of vinyl resin composition on a sheet of porous and fibrous material to give an adherent coating thereon and applying to the film thus deposited an emulsion comprising a hydrocarbon wax melting above about 65° C. dispersed in water by the aid of an emulsifying agent, said emulsifying agent being selected from the group consisting of morpholine and ammonium salts of fatty acids, removing the volatile constituents from the emulsion, and forming on said film a continuous, adherent, and very thin coating of said wax adapted to assist said vinyl resin film in resisting the transmission of water vapor, said vinyl resin being substantially identical with that resulting from the conjoint polymerization of vinyl chloride with vinyl acetate.

13. Process for making a composite structure highly resistant to the transmission of water vapor, which comprises incorporating a hydrocarbon wax in a vinyl resin composition, firmly adhering a film of said vinyl resin composition on a sheet of porous and fibrous material by calendering, and thereafter applying to said film a liquid, said liquid being a solvent for said wax and a penetrant, but not a solvent, for said vinyl resin, and causing the wax contained in said film to reform itself mostly on the surface of said vinyl resin film, said reformed wax surface being adapted to assist the vinyl resin film in resisting the transmission of water vapor.

14. Process for making a composite structure highly resistant to the transmission of water vapor, which comprises incorporating a hydrocarbon wax melting above about 65° C. in a vinyl resin composition, firmly adhering a film of said vinyl resin composition on a sheet of porous and fibrous material by calendering, and thereafter applying a liquid aromatic hydrocarbon to said film, and causing the wax contained in said film to reform itself mostly on the surface of said vinyl resin film, said reformed wax surface being adapted to assist the vinyl resin film in resisting the transmission of water vapor, said vinyl resin being substantially identical with that resulting from the conjoint polymerization of vinyl chloride with vinyl acetate.

FRED W. DUGGAN.
FRAZIER GROFF.